United States Patent Office 3,341,470
Patented Sept. 12, 1967

3,341,470
CHEMICAL PROCESS
Albert L. Hensley, Jr., Munster, Ind., assignor to Standard Oil Company, Chicago, Ill., a corporation of Indiana
No Drawing. Filed Feb. 27, 1963, Ser. No. 261,466
5 Claims. (Cl. 252—413)

This invention relates to the recovery and recycle of catalysts for liquid phase, molecular oxygen, oxidation process. More particularly, it concerns a method of obtaining these catalysts in a form suitable for recycle, and free from trace metal contaminants which tend to inhibit their maximum effectiveness.

Liquid phase, molecular oxygen, oxidation processes are now well established, and provide valuable techniques for obtaining many chemical products. See, for example, Saffer-Barker U.S. 2,833,816 for the oxidation of aliphatic-substituted aromatics to aromatic carboxylic acids; Hay U.S. 2,992,272 for the oxidation of aliphatics; also Belgian Patent 550,529 for additional oxidations.

Most of the foregoing oxidation processes employ a soluble heavy metal compound as either the sole catalyst, or as a catalyst constituent along with certain other materials such as bromine or ketones. For most oxidations, it has heretofore been known that the combination of cobalt and manganese affords particularly excellent results.

Unfortunately, it has recently been found that certain heavy metals, particularly iron, chromium and copper, which themselves are oxidation catalysts, are antagonistic when present as minor contaminants in oxidation processes employing the combination of cobalt and manganese. While this phenomenon is of only minor significance in the oxidative preparation of dibasic aromatic acids, in the preparation of tribasics and higher polybasics this contamination gives rise to very serious difficulties. For example, as little as nine parts per million of copper in the total charge can reduce the yield of trimellitic (1,2,4-benzene tricarboxylic) acid by 50%; 150 p.p.m. iron can reduce the trimellitic acid yield by some twenty percentage points; and 80 p.p.m. chromium can effect a 6–16 percentage point yield reduction. Thus it may be seen that cobalt manganese catalyst contamination by traces of certain other metals can be an expensive problem.

The problem is aggravated when it is desired to recover or recycle the oxidation catalyst. As a result of corrosion, an oxidation reaction mixture will almost inevitably become contaminated with minor amounts of iron and chromium, and if copper or copper alloys are employed in this system, copper likewise can be present. With almost deliberate perversity, it is in the preparation of tribasic acids such as trimellitic acid and trimesic acid where the large catalyst requirements frequently necessitate a metals recovery scheme, and it is in these very processes where trace contaminants have their most serious effect.

It has now been discovered, according to the invention, that cobalt and/or manganese oxidation catalysts may be recovered from an oxidation reaction mixture in a contaminant-free form by incinerating the stream to convert the various metals to their oxides, dissolving the oxides and by effecting selective chemical precipitation of the contaminants with specific reagents. In particular, the incinerated oxides are dissolved in aqueous sulfuric acid containing chlorides to reduce manganese to the soluble divalent form, and the solution is neutralized with calcium hydroxide and then buffered with limestone (calcium carbonate) to precipitate iron and chromium oxides. Finally, the cobalt and manganese are precipitated as carbonates by the introduction of sodium carbonate, and may be re-converted to a more desirable carboxylate form by treating with an organic acid, e.g., acetic acid.

If copper is present as a serious contaminant, this may be removed by treating the solution, prior to neutralization and buffering, with a soluble sulfide such as hydrogen sulfide or sodium sulfide, which causes the precipitation of copper sulfide.

The invention, in its various aspects, will be described in further detail in the ensuing specification, and an illustrative embodiment thereof is depicted in the included figure, showing a schematic flow sheet of the complete process.

Referring to the flow sheet, a plant residue containing contaminated cobalt and/or manganese carboxylate catalyst is first incinerated to convert the metals to their respective oxides. Plant residues are available in various forms, depending upon the particular acid recovery technique employed. Typically, if the acid product is insoluble in a reaction mixture, as in the case of terephthalic acid, the acid would be filtered out, or otherwise physically separated and the remaining mother liquor distilled to separate volatile components for recycle from a non-volatile distillation bottoms fraction containing the contaminated catalysts. On the other hand, if the acid product is soluble, or only partially soluble, in the reaction mixture, then various techniques of crystallization and/or distillation may be employed. In any event, suitable plant residues are those which contain the contaminated catalyst in any concentration or purity.

Incineration may be accomplished by any suitable technique for disposing of ash-forming liquids or solids. If, as is typically the case, the catalytic metal oxides form a volatile ash, then it is desirable to recover the volatile components by scrubbing or electrical precipitation of the flue gas incineration.

The ash is then taken up in concentrated aqueous sulfuric acid, e.g., 20–100% $H_2SO_4$, which contains sufficient chloride ion to reduce manganese to its soluble divalent form. Chloride ion is conveniently afforded by sodium chloride, dissolved to saturation in the sulfuric acid. Advantageously an excess of sulfuric acid is employed, e.g., from about 1.1 to about 1.8 times the theoretical quantity, preferably about 1.5 the theoretical amount. Sodium chloride, or other chloride-affording substances, should be present in at least the theoretical amount to reduce manganese dioxide.

Dissolving the metal oxides in sulfuric acids evolves chlorine gas in proportion to the amount of manganese present. This is advantageously recovered by sodium hydroxide absorption, and the resulting hypochlorite may be either wasted or recovered.

Should excessive copper be present in the contaminated catalyst, the mixed and heated (preferably above about 100° F.) sulfuric acid solution is contacted with a soluble sulfide in a quantity sufficient to effect stoichiometric reaction with the copper present. Hydrogen sulfide, ammonium sulfide, or the like may be employed for precipita-

CATALYST RECOVERY BY RESIDUE INCINERATION PROCESS

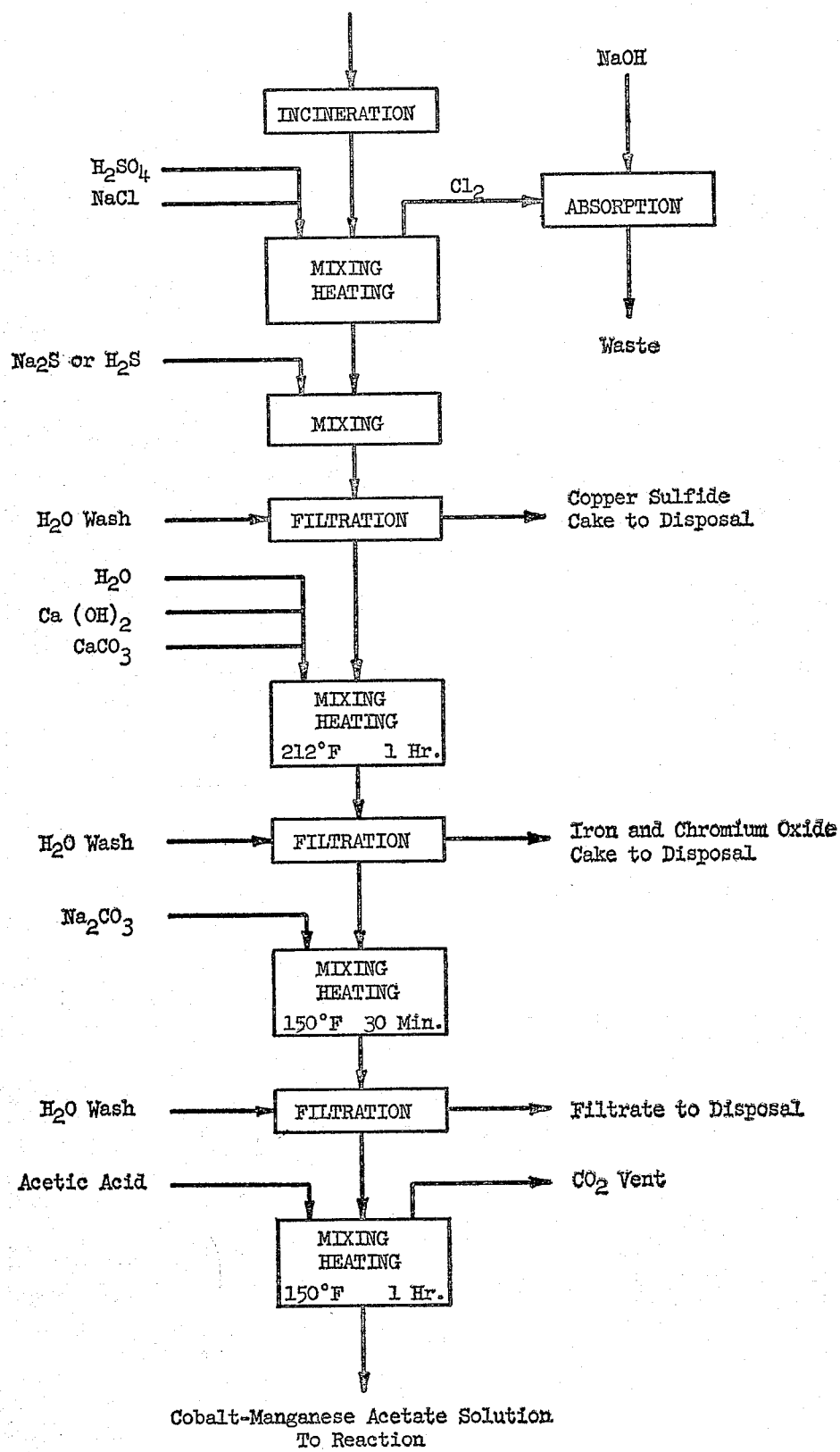

separation may be deferred until the subsequent separation of iron and chromium oxides.

The solution, with or without sulfide treatment, is then diluted with water and neutralized to a pH of about tion. Upon suitable mixing, the precipitated copper sulfide may be separated by filtration or other physical solid-liquid separation technique, and the copper sulfide filter cake water-washed prior to disposal. Alternatively, the 4.0 with calcium hydroxide, following which a calcium carbonate buffer is added, suitably in an amount approximating 40% by weight of the original metal oxides. (Calcium hydroxide may be added as such, or in the form of calcium oxide, or even as excess calcium carbonate which evolves $CO_2$ to become equivalent to the hydroxide.) The pH of the neutralized and buffered solution is about 4.8, more or less, and is heated to about 212° F. for about one hour to enable the iron and/or chromium oxide to form and precipitate out. This precipitation also assists in removing the last traces of copper sulfide from solution.

The slurry of iron and chromium oxide with mother liquor is then filtered or otherwise treated to separate the solids, and the solids washed prior to disposal. The foregoing treatment is almost completely effective at removing iron and chromium oxide. To recover the cobalt and/or manganese heavy metal catalyst components, sodium carbonate is then added, advantageously in an excess such as about 1.0 to about 1.6 times the theoretical quantity, e.g., 1.4. The solution is mixed with heating at about 150° F. for thirty minutes, and then filtered or otherwise treated to separate the precipitated cobalt and manganese carbonates from the remaining filtrate. The cake is then water-washed, and is suitable for return to the oxidation process.

It is frequently desired to convert the solid cobalt and manganese carbonates to more soluble carboxylates. Should this be the case, lower fatty acids, e.g., acetic acid, propionic acid, etc., or benzoic acid, may be added, and the mixture heated to about 150° F. for one hour with mixing. Manganese catalyst would be added at this step. Carbon dioxide is vented off, and the resulting solution constitutes a catalytically effected mixture and may be returned to the oxidation process.

TRACE METAL STUDIES

In order to evaluate the effects of various trace metals on the cobalt-manganese-bromine system, a series of laboratory studies is made under repeatedly controlled conditions.

For this series, pseudocumene is oxidized to trimellitic acid with air at 350 p.s.i.g. and 420° F. Pseudocumene oxidation with a cobalt-manganese-bromine catalyst is particularly susceptible to the presence of minor amounts of copper, iron, and chromium, and accordingly the trimellitic acid yield provides a sensitive measure of these effects.

In a typical reaction, there is charged to a 1" I.P. titanium reactor the following: 166.25 g. acetic acid; 50.00 g. of 98.3 mol percent pseudocumene; 0.50 g. tetrabromoethane; 8.75 g. water; 0.750 g. cobalt acetate tetrahydrate (Mallinckrodt analytical reagent grade, containing 0.0008 weight percent copper and less than 0.011 weight percent iron); 1.2500 g. manganous acetate tetrahydrate (Matheson reagent grade, containing 0.0005 weight percent copper and 0.0035 weight percent iron) and the desired amount of metal contaminant salt.

The entire charge is introduced to the reactor, which is then heated to 420° F. under 350 p.s.i.g. nitrogen. When the reactor reaches 420° F., air is admitted at the rate of 8 liters per minute until the vent gas shows at least 20 percent oxygen for ten minutes. The reactor product is withdrawn, dried, and trimellitic acid content determined by gas chromatographic analysis of its methyl ester.

The following examples illustrate several embodiments of the invention. It is understood, however, that these examples are for illustrative and demonstrative purposes only, and are not to be considered wholly definitive or exclusive with respect to conditions or scope.

Example I

An oxidation of pseudocumene is conducted in the manner described above, and the entire reaction mixture distilled to remove acetic acid and trimellitic anhydride.

Fifty grams of pilot plant trimellitic acid still bottoms are burned in a platinum dish to remove all organic matter. Ash weight 3.46 g. This residue is dissolved in 10 ml. of 37% HCl+20 ml. concentrated $H_2SO_4$. The salts are then taken to fumes of $H_2SO_4$ then transferred to a 400 ml. beaker and diluted to 200 ml. with water.

The solution is heated to boiling and calcium oxide slurried in water is added with vigorous stirring until a pH of 3.5 is reached. 2.0 g. of $CaCO_3$ slurried in water is added and the solution kept at 90–95° C. for 1 hour.

The hot solution is filtered using 41 paper in a Büchner funnel.

The precipitate is analyzed and found to contain less than 0.001% Co and $M_n$.

The cobalt and manganese in the filtrate are precipitated by adding 5 g. of $Na_2CO_3$. The carbonates are filtered, washed with water and dissolved in glacial acetic acid and diluted to 100 ml.

The acetic acid solution is analyzed by X-ray fluorescence and found to contain: 0.463% Co, 0.997% $M_n$, 0.0027% Fe, 0.01% Ni, 0.046% Cr, and 0.06% Ca.

Analysis of the original ash shows it to contain over 5% Fe. Thus this treatment removes about 97% of the iron present.

Example II

This run was made in the same way as the first to determine the reproducibility of the method.

50 g. still bottoms burned.
Ash dissolved in 5 ml. HCl+20 ml. con. $H_2SO_4$
Salts taken to $H_2SO_4$ fumes.
Transferred to 1 l. beaker.
Diluted to 200 ml. and heated to boiling.
CaO slurry added to pH 3.5.
2.0 g. $CaCO_3$ added.
Heated 1 hour 90–95° C.
Filtered.
Purified filtrate with 5 g. $Na_2CO_3$—filtered, washed 2 times with 100 ml. portions of water.
Cobalt and manganese carbonates dissolved in glacial acetic acid and diluted to 100 ml.
Analysis of acetic acid solution: 0.46% Co, 0.0042% Cr, 0.0018% Fe, 1.08% $M_n$, 0.0096% Ni, 0.063% Ca.

Example III

This example illustrates the separation of copper with hydrogen sulfide.

20.0 grams cobalt+40 g. $M_n$ and 3 g. $Fe^{+++}$ all as sulfates are dissolved in 1.5 l. $H_2O$. 0.06 g. of Cu as sulfate is added.

The solution is heated to boiling and saturated with $H_2S$ by bubbling $H_2S$ gas through the solution for 20 minutes.

While the solution remains hot the pH is raised to 3.5 using a slurry of calcium oxide in water. 20 g. of $CaCO_3$ is then added and the solution boiled for 20 minutes and then filtered.

The filtrate is heated to about 70° C. and an excess of $Na_2CO_3$ (120 g.) added. The precipitated Co and Mn carbonate slurry is heated for 1 hour and then filtered.

The wet cake is washed with water and then dissolved in acetic acid. The excess acetic acid is boiled off and the dry metal acetates sent for emission spec. analysis.

Results: 0.7% Ca, 7 p.p.m. Cu, 100 p.p.m Fe, 0.038% Ni.

Example IV

Trimellitic acid still bottoms are burned and the ash saved until 50 g. of ash is obtained.

It is placed in a 2 l. beaker and 100 ml. concentrated $H_2SO_4$ and 10 g. NaCl dissolved in 40 ml. water added. The solution is heated on a hot plate until fumes of sulfuric acid evolve. Most of the material goes into solution but comes back out as sulfate salts. The sample is diluted with 1000 ml. of water and boiled. Most of the material dissolves but a small amount of black residue remains (probably carbon). The hot solution is neutralized to pH 3.5 using a water slurry of CaO. Then 20 g. of $CaCO_3$ is added and the solution boiled for 1 hour. It is then filtered and the filtrate heated to about 80° C. and 120 g. $Na_2CO_3$ in water is added. The precipitated cobalt and manganese carbonates are digested for 1 hour at 80–90° C. and then filtered. The precipitate is washed with two 200 ml. portions of water and then dissolved in acetic acid. Excess acid and water are boiled off and 72 g. of salt is obtained.

One gram of the material is dissolved in 100 ml. of acetic acid and analyzed by X-ray fluorescenece and found to cointain: 0.083% Co, 0.001% Fe, 0.159 $M_n$.

The rest of this material is tested for oxidizing pseudocumene to form trimellitic acid. This material gives acid yields ranging from 68.4 to 79.2%. This is about the same range as is found for new catalyst.

Thus, it is evident that there has been provided, according to the invention, a unique and valuable method of recovering and recycling the cobalt and/or manganese catalyst employed in a liquid phase, molecular oxygen, oxidation process. The invention process eliminates inhibiting amounts of iron and chromium, and thus permits facile and efficient re-use of the catalyst.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:
1. A process for recovering and recycling catalyst, selected from the group consisting of cobalt and manganese catalysts and mixtures thereof, used in a liquid phase molecular oxygen oxidation process, wherein said catalyst contains minor, but oxidation-inhibiting, amounts of a contaminant metal from the group consisting of iron, chromium, copper and mixtures thereof, said process comprising:
   (a) oxidizing said contaminated catalyst by incineration,
   (b) dissolving said oxidized catalyst with sulfuric acid,
   (c) treating the resulting acidic solution with calcium hydroxide, to neutralize sulfuric acid, until the acidic solution has a pH of about 4,
   (d) buffering the calcium hydroxide treated solution with calcium carbonate and precipitating a contaminant metal oxide,
   (e) separating said oxide from the solution,
   (f) introducing sodium carbonate to the solution and precipitating a carbonate of the catalyst, free from inhibiting metals,
   (g) converting the catalyst carbonate to a carboxylate salt by treatment with an organic acid, and
   (h) reintroducing the catalyst to the oxidation process.
2. Process of claim 1 wherein said buffering is conducted to a pH about 4.8.
3. Process of claim 1 wherein said copper contaminant metal is treated with a sulfide prior to neutralization to thereby precipitate copper sulfide.
4. Process of claim 3 wherein said sulfide is hydrogen sulfide.
5. Process of claim 1 wherein said oxidation process is the heavy metal-bromine catalyzed oxidation of pseudocumene to prepare trimellitic acid.

References Cited
UNITED STATES PATENTS
2,381,659    8/1945    Frey _____ 252—412
3,105,851    10/1963    Knobloch et al. ____ 252—413 X

OTHER REFERENCES
Partington: "A Textbook of Inorganic Chemistry," 6th ed., 1950, McMillan & Co., Ltd., London, pp. 902 and 942.

Vogel: "A Textbook of Macro and Semimicro Qualitative Inorganic Analysis," 4th ed., 1954, Longmans Green & Co., New York, pp. 218 and 259.

OSCAR R. VERTIZ, *Primary Examiner.*

MAURICE A. BRINDISI, *Examiner.*

R. D. EDMONDS, H. S. MILLER, *Assistant Examiners.*